United States Patent
Fiedler et al.

(10) Patent No.: US 11,281,177 B2
(45) Date of Patent: Mar. 22, 2022

(54) METHOD, COMMUNICATION MODULE AND SYSTEM FOR TRANSMITTING DIAGNOSIS DATA OF A FIELD DEVICE IN AN INSTALLATION FOR PROCESS AUTOMATION

(71) Applicant: Endress+Hauser Process Solutions AG, Reinach (CH)

(72) Inventors: Marc Fiedler, Reinach (CH); Vincent de Groot, St. Louis (FR)

(73) Assignee: ENDRESS+HAUSER PROCESS SOLUTIONS AG, Reinach (CH)

( * ) Notice: Subject to any disclaimer, the term of this patent is extended or adjusted under 35 U.S.C. 154(b) by 378 days.

(21) Appl. No.: 16/343,089

(22) PCT Filed: Sep. 15, 2017

(86) PCT No.: PCT/EP2017/073229
§ 371 (c)(1),
(2) Date: Apr. 18, 2019

(87) PCT Pub. No.: WO2018/072939
PCT Pub. Date: Apr. 26, 2018

(65) Prior Publication Data
US 2020/0050165 A1    Feb. 13, 2020

(30) Foreign Application Priority Data
Oct. 21, 2016 (DE) .................... 10 2016 120 108.1

(51) Int. Cl.
*G05B 19/04* (2006.01)
*G05B 19/042* (2006.01)

(52) U.S. Cl.
CPC .............. *G05B 19/0428* (2013.01); *G05B 2219/24069* (2013.01); *G05B 2219/25186* (2013.01); *G05B 2219/25428* (2013.01)

(58) Field of Classification Search
CPC ............ G05B 19/0425; G05B 19/0428; G05B 2219/24069; G05B 2219/25186; G05B 2219/25428
See application file for complete search history.

(56) References Cited

U.S. PATENT DOCUMENTS

| 7,262,693 B2 | 8/2007 | Karschnia et al. |
| 9,197,143 B1 | 11/2015 | Townsend et al. |

(Continued)

FOREIGN PATENT DOCUMENTS

| DE | 102013106098 A1 | 12/2014 |
| DE | 102015117011 A1 | 4/2017 |
| WO | 2012021484 A1 | 2/2012 |

OTHER PUBLICATIONS

Search Report for German Patent Application No. 10 2016 120 108.1, German Patent Office, dated Oct. 12, 2017, 7 pp.

(Continued)

*Primary Examiner* — Tuan C Dao
(74) *Attorney, Agent, or Firm* — Mark A. Logan; Endress+Hauser (USA) Holding Inc.

(57) ABSTRACT

The present disclosure comprises a method, a communication module, and a system for transmitting diagnosis data of a field device that is connected to a superordinate unit via a communication loop. The communication module is connected to the communication loop in parallel with the field device. The method includes the continual storage of electrical energy in the communication module by a transducer unit within the communication module that captures an electrical and/or physical variable and converts it into electrical energy. The method includes polling the diagnosis data of the field device by the communication module and wireless transmission of the polled diagnosis data to a reception unit by the communication module.

14 Claims, 2 Drawing Sheets

(56) References Cited

U.S. PATENT DOCUMENTS

| | | | | |
|---|---|---|---|---|
| 2001/0016688 A1* | 8/2001 | Moore | A61B 8/4461 | 600/466 |
| 2003/0083794 A1* | 5/2003 | Halm | G07C 3/00 | 701/29.4 |
| 2003/0233165 A1* | 12/2003 | Hein | G06Q 10/087 | 700/216 |
| 2004/0035620 A1* | 2/2004 | McKeefery | A63H 30/04 | 180/168 |
| 2005/0211187 A1* | 9/2005 | Harman | A01K 15/023 | 119/721 |
| 2007/0013194 A1* | 1/2007 | Galley | F03D 1/00 | 290/44 |
| 2007/0039643 A1* | 2/2007 | Luo | H02S 99/00 | 136/244 |
| 2007/0159842 A1* | 7/2007 | Cole | G02B 6/001 | 362/555 |
| 2008/0013226 A1* | 1/2008 | Kirst | H02H 9/008 | 361/18 |
| 2008/0307143 A1* | 12/2008 | Lin | G06F 13/385 | 710/302 |
| 2009/0195174 A1* | 8/2009 | Jin | H05B 41/2822 | 315/277 |
| 2011/0134937 A1* | 6/2011 | Lichoulas | H04Q 1/028 | 370/463 |
| 2012/0217111 A1* | 8/2012 | Boys | H02J 50/80 | 191/10 |
| 2013/0340977 A1* | 12/2013 | Singleton | H05K 7/20809 | 165/104.21 |
| 2014/0143607 A1* | 5/2014 | Vogt | H04L 12/40045 | 714/43 |
| 2014/0346965 A1* | 11/2014 | Moosmann | H05B 45/38 | 315/200 R |
| 2015/0241566 A1* | 8/2015 | Chakraborty | H04B 1/59 | 342/357.74 |
| 2015/0317886 A1* | 11/2015 | Kidger | G08B 7/06 | 340/286.02 |
| 2016/0152252 A1* | 6/2016 | Kim | B61K 9/00 | 701/31.4 |
| 2016/0337700 A1* | 11/2016 | Wilson | H04N 21/4383 | |
| 2016/0379782 A1* | 12/2016 | Lee | H02J 13/00 | 307/140 |
| 2017/0025857 A1* | 1/2017 | Matthews | H02J 50/40 | |

OTHER PUBLICATIONS

International Search Report for Patent Application No. PCT/EP2017/073229, WIPO, dated Nov. 22, 2017, 12 pp.

\* cited by examiner

METHOD, COMMUNICATION MODULE AND SYSTEM FOR TRANSMITTING DIAGNOSIS DATA OF A FIELD DEVICE IN AN INSTALLATION FOR PROCESS AUTOMATION

CROSS-REFERENCE TO RELATED APPLICATIONS

The present application is related to and claims the priority benefit of German Patent Application No. 10 2016 120 108.1, filed on Oct. 21, 2016 and International Patent Application No. PCT/EP2017/073229 filed on Sep. 15, 2017, the entire contents of which are incorporated herein by reference.

TECHNICAL FIELD

The invention relates to a method and a communications module for transmitting diagnosis data of a field device in an installation for process automation. The invention further relates to a system for transmitting diagnosis data from a plurality of field devices in an installation for process automation.

BACKGROUND

Field devices that are used in industrial facilities are already known from the prior art. Field devices are often used in process automation as well as in manufacturing automation. Field devices, in general, refer to all devices which are process-oriented and which supply or process process-relevant information. Field devices are thus used for detecting and/or influencing process variables. Measuring devices, or sensors, are used for detecting process variables. These are used, for example, for pressure and temperature measurement, conductivity measurement, flow measurement, pH measurement, fill-level measurement, etc., and detect the corresponding process variables of pressure, temperature, conductivity, pH value, fill-level, flow, etc. Actuators are used for influencing process variables. These are, for example, pumps or valves that can influence the flow of a fluid in a pipe or the fill-level in a tank. In addition to the aforementioned measuring devices and actuators, field devices are also understood to include remote I/O's, radio adapters, or, generally, devices that are arranged at the field level.

A variety of such field devices are produced and marketed by the Endress+Hauser group.

In modern industrial installations, field devices are usually connected to superordinate units via communications networks, such as fieldbuses (Profibus®, Foundation® Fieldbus, HART®, etc.). Normally, the superordinate units are control units, such as an SPC (stored program control) or a PLC (programmable logic controller). The superordinate units are used for process control as well as for commissioning the field devices, among other things. The measured values detected by the field devices, especially, by sensors, are transmitted via the respective bus system to a (or possibly several) superordinate unit(s) that further process the measured values, as appropriate, and relay them to the control station of the installation. The control station serves for process visualization, process monitoring, and process control via the superordinate units. In addition, data transmission from the superordinate unit via the bus system to the field devices is also required, especially for configuration and parameterization of field devices and for controlling actuators.

In order to operate the field devices, corresponding operating programs (operating tools) are necessary which either run independently on the superordinate units (Endress+Hauser FieldCare, Pactware, AMS Fisher-Rosemount, PDM Siemens) or are also integrated in applications of the control station (Siemens PCS7, ABB Symphony, Emerson Delta V).

In many older installations, however, the field devices frequently still communicate with the superordinate units by means of 4-20 mA technology. For this purpose, the field devices are designed as two-wire field devices and are connected to the superordinate units by means of a communications loop. The magnitude of the process values determined by the field devices is transmitted to the superordinate units via varying current values in the range of 4 to 20 mA, corresponding to the current magnitude of the process values.

Many of these field devices have the option of being parameterized via the HART protocol by modulating a digital signal onto the direct current by means of an FSK (frequency shift keying) modem. However, this technology is often used only for parameterizing the field devices by means of an operating unit, especially, a mobile operating unit, whereas it is not possible to read out further information, such as diagnosis data, by means of the superordinate units, even though the field devices themselves have this option.

Retrofitting the installation with additional components which enable digital communication with the field devices is also associated with high outlay in terms of the installation of these additional components, in addition to the costs incurred for the acquisition of the additional components. On the one hand, this is due to the fact that the electrical and/or mechanical installation is very complex due to the limited installation space at the measuring points. On the other hand, system processes would have to be stopped, since the communications loops have to be opened for the electrical installation of the additional components.

Another problem is the need to power these additional components. Since the energy provided by the respective communications loop is often insufficient to also supply the additional components without impairing the communication and/or the measuring accuracy in the process, an additional power supply is necessary. A battery supply of the additional components is associated with disadvantages, since the battery must be changed more or less frequently depending upon the energy demand of the respective additional component, which constitutes a high outlay in the case of a high number of batteries to be exchanged and is not easily possible, especially, in hazardous conditions because of the risk of sparking.

SUMMARY

Starting from this problem, the invention is based upon the aim of providing a method, a communications module, and a system which allow an existing installation for process automation to be retrofitted with little installation effort, in order to obtain diagnosis data from field devices located in the installation.

The aim is achieved by a method for transmitting diagnosis data of a field device in an installation for process automation, wherein the field device has a communications link to a superordinate unit via a communications loop, and wherein a communications module is connected to the communications loop such that the communications module is connected in parallel with the field device, comprising:

continual storage of electric power in an energy storage unit of the communications module by means of a transducer unit connected upstream of the energy storage unit up to a predetermined limit value, wherein the transducer unit captures an electrical and/or physical variable and converts it into electric power;

polling of the diagnosis data of the field device by a communication command by means of the communications module;

reception of the diagnosis data of the field device by the communications module by means of a communication command sent by the field device and wireless transmission of the polled diagnosis data to a reception unit by means of the communications module as soon as the electric power stored in the energy storage unit reaches, or has exceeded, the predetermined limit value and/or if the communications module receives a command for polling or transmitting.

The great advantage of the invention is that diagnosis data are polled from the field device in a simple manner and are available at a central location. Since the communications module which reads out the diagnosis data obtains its power required for polling and transmitting from components of the current signal which are not required for the measurement or via energy harvesting, no separate power supply is necessary. The analog measured value and its accuracy are not affected in this case. Only the reception unit, which is, for example, a gateway or a router, must be supplied with power separately.

The communications loop is preferably a 4-20 mA current loop. The communication command sent by the communications module to the field device is effected via the HART protocol. For this purpose, the communication command is transmitted by means of frequency shift keying (FSK) as current modulation. The field device itself then sends the desired diagnosis data back to the communications module by means of a HART communication pulse. Before commissioning, the communications module must be configured in such a way that it receives the network address of the field device for polling the diagnosis data.

The diagnosis data are, in particular, diagnosis data conforming to Namur NE107 or other diagnosis data for checking the device function or the calibration requirement of a field device. The diagnosis data can also be events which have a specific effect on the field device, such as parameterization processes or having exceeded or fallen below defined measurement thresholds.

The wireless transmission of the polled diagnosis data to the reception unit can take place by means of any conventional wireless protocol. Examples of wireless protocols are Bluetooth, Zigbee, Wi-Fi, but also wireless fieldbus protocols, such as WirelessHART. It is especially advantageous if the wireless transmission requires only a small amount of energy, for which reason low-power, short-range radio techniques, such as Bluetooth LE, are preferably suitable as transmission technology.

The diagnosis data transmitted to the reception unit are stored in the latter and can be read out from the reception unit by means of an operating tool, such as a hand-held or mobile end device, such as a smartphone or a tablet. The diagnosis data stored in the reception unit are read out in this case via a wired communications link or, alternatively, via a wireless communications link, such as Wi-Fi, Bluetooth, or Zigbee.

In an alternative application, the current loop is a HART communications loop or a fieldbus of automation technology. Examples of such a fieldbus are mentioned by way of example in the introductory part of the description. Analogously, the communication commands of the communications module are commands which are formed by means of the respective fieldbus protocol. For this application, the goal is not retrofitting the installation in terms of digital communication, but rather the possibility of modernizing the installation with regard to the topics, "Industry 4.0" and/or "Internet of Things (IoT)." For example, diagnosis data can be collected at a central location in the reception unit and then sent to a web-based database by means of the reception unit.

Field devices that are mentioned in connection with the invention are described by way of example in the introductory part of the description.

A first variant of the method according to the invention provides that the transducer unit convert voltage/current pulses emitted by the superordinate unit or by the field device, e.g., in the form of communication pulses, into electric power. For this purpose, the superordinate unit is designed to generate these voltage/current pulses. It is preferably an alternating signal, i.e., an alternating voltage or an alternating current, which is modulated onto the direct component of the supply/measurement current of the current loop. This alternating signal is tapped by the communications module and stored as electric power in the energy storage unit. The frequency of the alternating signal may differ significantly from the frequency of the communication signal (e.g., HART) in order to avoid mutual interference and communication disturbances. The communication command which is sent by the field device and which contains the diagnosis data can also provide energy for the communications module as voltage/current modulation, especially, if these commands are sent in the form of bursts, i.e., repeated multiple times.

In this case, it can be provided that the alternating signal be a HART command. The superordinate unit is designed in such a way that it sends out the HART command at regular time intervals. The HART command itself is of no importance to the field device and contains, for example, an invalid command for the field device or a different receiving address than the network address of the field device. In this case, the communications unit is able to recognize when the incoming HART command used for the supply ends, and the HART communications loop can be used for its own communication of the diagnosis data.

Alternatively, the field device is designed to generate these voltage/current pulses. In this case, it can be provided that these voltage/current pulses be HART commands. The field device is designed in such a way that it transmits HART commands/payload data at regular time intervals, which can be used for diagnostic purposes, for example. These transmitted data can then be received and processed by the communications unit.

A second variant of the method according to the invention provides that the reception unit have a light source, wherein the transducer unit receives light emitted by the light source and converts it into electric power. The light source can be one or more LED's or an LED array which emits light in the visible or invisible (infrared or ultraviolet) spectrum.

A third variant of the method according to the invention provides that the reception unit have a radio module which emits an electromagnetic field, wherein the transducer unit receives at least a part of the emitted electromagnetic field of the radio module and converts it into electric power.

A preferred embodiment of the method according to the invention provides that the reception unit provide the transmitted diagnosis data to the control station of the installation. As a result, the polled diagnosis data of all field devices transmitted to the reception unit not only are available at the reception unit itself, but can also be visualized and/or processed further in the control station. The connection of the reception unit to the control station is preferably effected via the same network with which the superordinate unit is connected to the control station—for example, via Profibus PA or Ethernet. Alternatively, however, any conventional wired or wireless communications link may be used.

According to an advantageous development of the method according to the invention, the reception unit provides the diagnosis data with additional information, especially, with the identification of the field device and/or with a time stamp. The diagnosis data are thus already processed directly by the reception unit, which allows simple assignment.

An advantageous embodiment of the method according to the invention provides that the step of wirelessly transmitting the polled diagnosis data to the reception unit be performed by the polling unit of the communications module after each polling of the diagnosis data. This ensures that the collected data are promptly available to the reception unit and, via it, to the control station.

A further advantageous embodiment of the method according to the invention provides that the polled diagnosis data be combined in the communications module, and the collected diagnosis data be transmitted wirelessly to the reception unit at defined time intervals. In this case, the energy consumption of the communications modules can be reduced, since a transmission process does not necessarily follow each polling process. In addition, the frequency of the polling processes can in this way be increased when the energy demand of the communications modules stays the same.

The aim is also achieved by a communications module for carrying out the method according to the invention, comprising:
- an energy storage unit having an upstream transducer unit, wherein the transducer unit converts an electrical and/or a physical variable into electric power, and wherein the energy storage unit stores the converted electric power;
- a polling unit for polling diagnosis data of the field device; and
- a transmission unit for wirelessly transmitting the polled diagnosis data to the communications unit.

An advantageous embodiment of the communications module according to the invention provides that the communications module have terminals or insulation displacement terminals by means of which the communications module is connected to the cables of the communications loop, wherein the communications loop is not interrupted when the communications module is connected to the communications loop. The installation of the communications module can thus be accomplished in a simple manner. Since the communications loop is not interrupted in order to install the communications module, the conventional operation of the installation can be continued even during the time period of the installation.

A preferred development of the communications module according to the invention provides that the energy storage unit be formed by a capacitor, especially, by a double-layer capacitor or by a super capacitor, or by a battery.

A first variant of the communications module according to the invention provides that the transducer unit be formed by at least one rectifier circuit, especially, by a diode-, detector-, half- or full-rectifier, which is connected to the communications loop. Any further type of circuit of a rectifier is also suitable for use in the communications module.

A second variant of the communications module according to the invention provides that the transducer unit have at least one photodiode or at least one photovoltaic cell. Any other component which receives light and converts it into electric power, such as a phototransistor, is also suitable for use in the communications module.

A third variant of the communications module according to the invention provides that the transducer unit have at least one induction coil or at least one antenna. Any other component which receives an electromagnetic or magnetic field and converts it into electric power is also suitable for use in the communications module.

An advantageous embodiment of the communications module according to the invention provides that the transmission unit be located in the housing of the communications module.

According to an advantageous development of the communications module according to the invention, the transmission unit has a separate housing and is connected to the communications module, especially, via an interface. In this case, costs may be saved in terms of production, since transmission units already available on the market, such as Bluetooth, Wi-Fi, or similar radio modules, can be used, as a result of which only the remaining components of the communications module need be manufactured. The aim is further achieved by a system for transmitting diagnosis data from a plurality of field devices in an installation for process automation, comprising:
- a superordinate unit in communication with the individual field devices by means of a respective separate communications loop;
- a plurality of communications modules, each connected to the individual communications loops such that the communications modules are each connected in parallel with the corresponding field device, and each having at least one energy storage unit, a polling unit, and a transmission unit, wherein the energy storage unit collects electric power by a transducer unit, connected upstream of the energy storage unit, capturing an electrical and/or physical variable and converting it into electric power;
- a reception unit, wherein the communications modules poll diagnosis data from the respective field devices and transmit the polled diagnosis data to the reception unit via a wireless radio link as soon as a predetermined limit value of stored energy is reached in the corresponding energy storage units of the communications modules or when one of the communications modules receives a command for polling or transmitting.

The cables of the individual communications loops often converge in a control cabinet, in which the superordinate unit is located. It can therefore be provided that the individual communications modules be adapted to the respective communications loops for efficient use in the control cabinet, wherein the reception unit likewise is placed in the control cabinet. It is thereby possible to place many of the communications modules spatially close to the reception unit. Because each individual communications module gains its energy autonomously and only the reception unit has to be supplied with power In an advantageous development of the system according to the invention, the reception unit is designed in such a way that the reception unit has a communications link to the control station via a wireless or wired network and provides the transmitted diagnosis data to the control station via the network. As a result, the polled diagnosis data of all field devices transmitted to the reception unit not only are available at the reception unit itself, but can also be visualized and/or processed further in the control station.

BRIEF DESCRIPTION OF THE DRAWING

The invention is explained in greater detail with reference to the following figures. Illustrated are.

DETAILED DESCRIPTION

Figure 1:
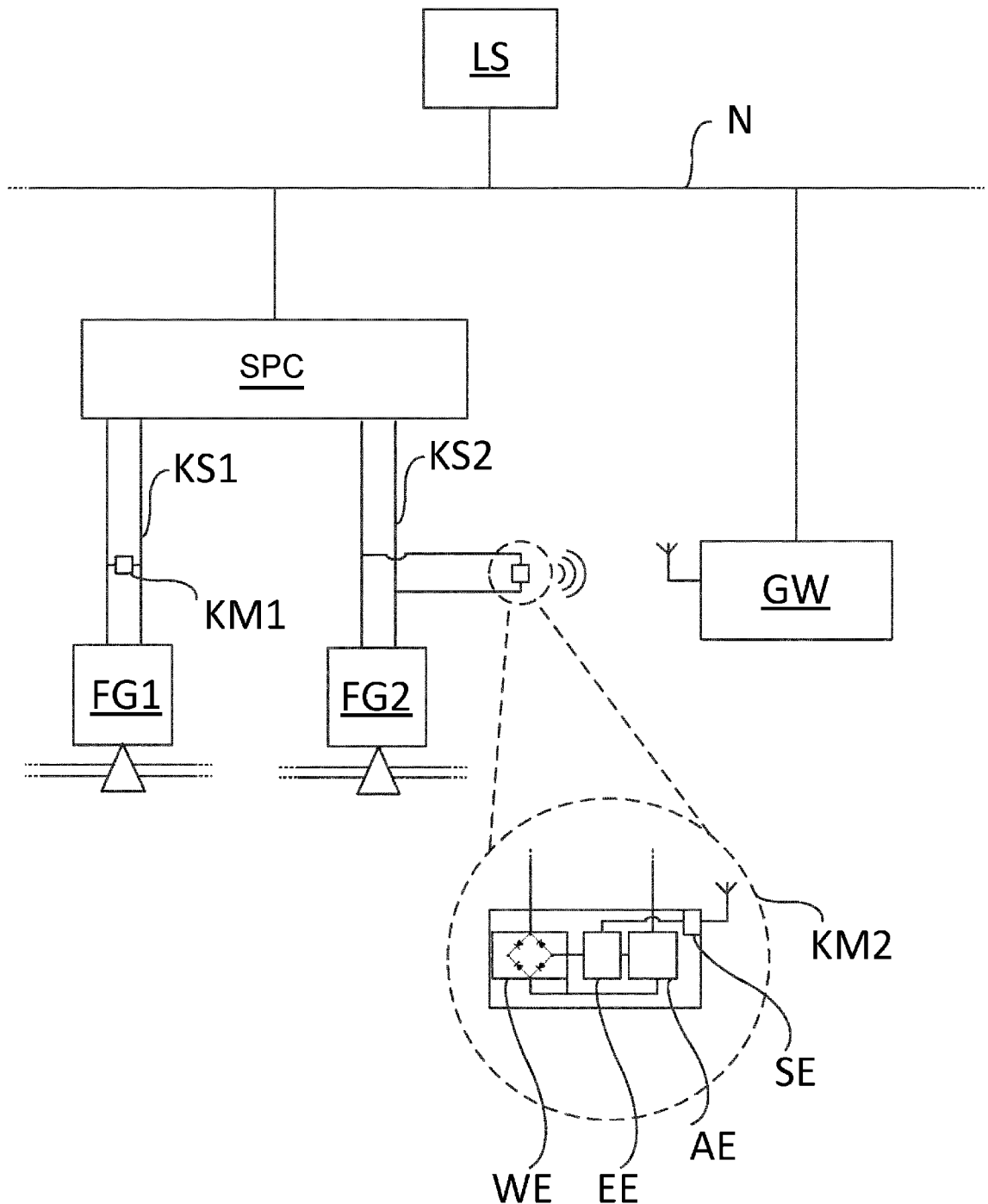
FIG. 1 a first variant of an embodiment of the system according to the invention for transmitting diagnosis data from a plurality of field devices in an installation for process automation.

FIG. 1 shows a first variant of an embodiment of the system according to the invention for transmitting diagnosis data from a plurality of field devices FG1, FG2 in an installation for process automation. Two field devices FG1, FG2 are located in the installation. These field devices FG1, FG2 are, for example, flowmeters. However, they may be any field devices as mentioned in the introductory part of the description by way of example, as well as any number of these field devices FG1, FG2.

The field devices FG1, FG2 are each connected by means of a communications loop KS1, KS2 to a superordinate unit SPC. This superordinate unit SPC is, especially, a stored program control or a PLC. The communications loops KS1, KS2 are in each case a 4-20 mA current loop, by means of which the respective measured process values of the field devices FG1, FG2 are transmitted to the superordinate unit SPC.

The superordinate unit SPC itself is connected to the control station LS of the installation via a network N, e.g., Ethernet or Profibus DP.

In order to read out diagnosis data from the field devices FG1, FG2, a respective communications module KM1, KM2 is plugged onto the cables of the respective communications loop KS1, KS2. The communications modules KS1, KS2 are preferably plugged onto the cables of the communications loops KS1, KS2 in the control cabinet, especially, at the point at which the cables of the communications loops KS1, KS2 are brought together to the superordinate unit SPC.

The communications modules KM1, KM2 are attached to the cables of the communications loops KS1, KS2 by means of insulation displacement terminals such that the communications modules KM1, KM2 are connected in parallel with the respectively corresponding field device FG1, FG2, which has the advantage that the communications loops KS1, KS2 do not have to be disconnected.

The communications modules KM1, KM2 comprise a transducer unit WE consisting of a rectifier circuit for generating electric power. For this purpose, the superordinate unit SPC is designed to generate these communication pulses. The communication pulses are an alternating current or an alternating voltage which is modulated onto the direct current of the communications loops KS1, KS2. This alternating current component is tapped by the transducer unit WE of the communications modules KM1, KM2. The rectifier circuit in the transducer unit WE rectifies the modulated alternating current component, transmits it to an energy storage unit EE connected downstream of the transducer unit WE, and stores it in the energy storage unit EE.

In this case, it can be provided that the communication pulse be a HART command. The superordinate unit SPC is then designed in such a way that it sends out the HART command at regular time intervals. The HART command itself is of no importance to the field device FG1, FG2 and contains, for example, an invalid command for the field device FG1, FG2 or a different receiving address than the network address of the field device FG1, FG2.

The amount of electric power stored in the energy storage unit EE is detected. As soon as a predetermined limit value, which is adjustable by the user, is reached in one of the communications modules, a polling unit AE located in the communications module KM1, KM2 sends a communication command to the corresponding field device FG1, FG2 for polling current diagnosis data of the field device FG1, FG2.

The communication command sent by the communications module KM1, KM2 to the field device FG1, FG2 is based upon HART. For this purpose, the communication command is modulated onto the present current value of the 4-20 mA current loop. In contrast to the superordinate unit SPC, the field device must be HART-enabled in order to "understand" the communication command.

The field device FG1, FG2 itself sends the desired diagnosis data back to the communications module KM1, KM2 by means of a HART communication pulse. Before commissioning, the communications module KM1, KM2 must, however, be configured in such a way that it knows the network address of the field device for polling the diagnosis data.

After the communications module KM1, KM2 has received the diagnosis data of the field device FG1, FG2, it augments them with additional information, such as a time stamp and the identification of the field device FG1, FG2. Subsequently, the diagnosis data are transmitted wirelessly by means of a transmission unit SE to a reception unit GW using electric power from the energy storage unit EE, whereupon the reception unit GW stores the diagnosis information.

Alternatively to reaching a limit value, the polling or transmission of the polled diagnosis data is triggered by a command, e.g., by a keypress on the housing of the respective communications module KM1, KM2.

The stored diagnosis information can then be read out of the reception unit GW by a PC, a mobile operating unit, or a mobile end device by means of a wired or a wireless communications link. Alternatively, the reception unit GW is connected to the control station LS of the installation and provides the stored diagnosis information to the control station.

Figure 2:
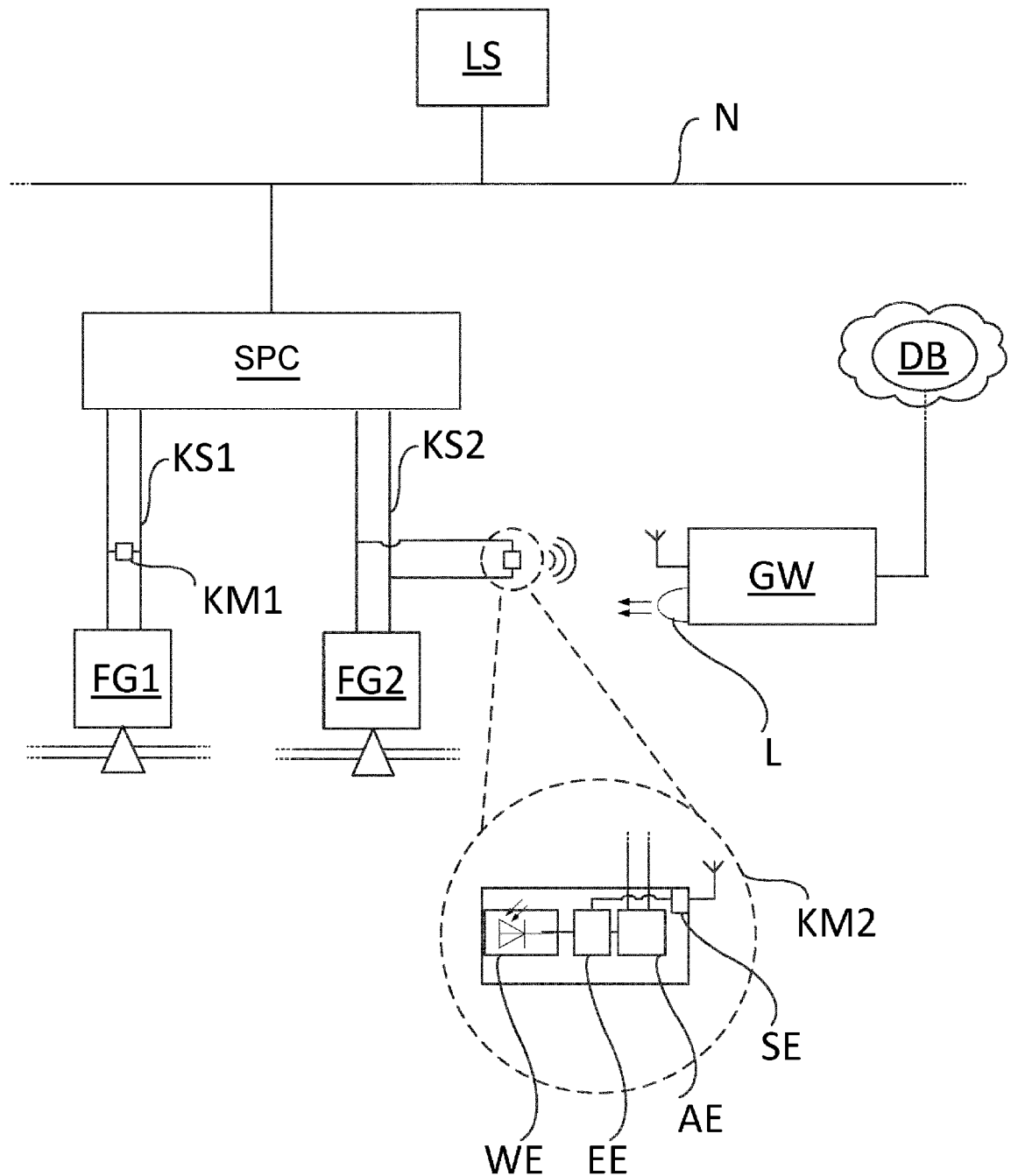
FIG. 2 a second variant of an embodiment of the system according to the invention for transmitting diagnosis data from a plurality of field devices in an installation for process automation.

FIG. 2 shows a second variant of an embodiment of the system according to the invention for transmitting diagnosis data from a plurality of field devices FG1, FG2 in an installation for process automation. In contrast to FIG. 1, the two communications loops KS1, KS2 are formed by fieldbuses, e.g., HART, Profibus PA, Foundation Fieldbus, Modbus, etc., via which the field devices FG1, FG2 communicate with the superordinate unit SPC.

Since the data are exchanged between the field devices and the superordinate unit via communication pulses, i.e., currents with an alternating current/alternating voltage component, the current conversion mechanism described in FIG. 1 cannot be used, since communication would be impaired otherwise. As an alternative, the communications modules KM1, KM2 each have a transducer element WE which converts light into electric power which is stored in the energy storage unit EE of the communications modules KM1, KM2.

If the communications modules KM1, KM2 are attached outside the control cabinet to the cables of the communications loops KS1, KS2, sunlight or illumination light of the installation can be received by the transducer unit WE in order to generate electric power.

If the communications modules KM1, KM2 are located in the control cabinet, and thus in the dark, the reception unit GW has a light source L. This light emitted by the light source L is received by the transducer unit WE of the communications modules KM1, KM2 and converted into electric power.

Alternatively, the reception unit GW comprises a radio module which emits an electromagnetic field or a magnetic field. The transducer unit WE has an induction coil or an antenna and can thus receive the electromagnetic or magnetic field and convert it into electric power.

None of the components FG1, FG2, SPC, LS of the installation shown in FIG. 2 has an internet-capable interface. In order to use diagnosis data of the field devices FG1, FG2 in the sense of IoT applications, expensive retrofitting of the components FG1, FG2, SPC, LS of the installation would be necessary. The reception unit GW therefore, advantageously, has an Internet interface via which the diagnosis data are sent to a web-based database DB. This can be done in both a wired and a wireless manner, e.g., via GSM. It may also be provided that another type of data, in particular process values, identification information, etc., be read out by means of the communications modules KM1, KM2 and sent to the web-based database DB via the reception unit. In this way, the installation can be easily and cost-effectively modernized for modern IoT applications.

It goes without saying that the method according to the invention and the system according to the invention can be used for any type and any number of field devices FG, and are not limited to the exemplary embodiments illustrated in FIG. 1 and FIG. 2.

The invention claimed is:

1. A method for transmitting diagnosis data of a field device in an installation for process automation, wherein the field device has a communications link to a superordinate unit via a wired communications loop; comprising:
   providing a communications module, the communications module including:
      a transducer unit embodied to convert alternating current (AC) communication signals and pulses that are modulated onto a direct current (DC) signal on the communications loop into electrical energy;
      an energy storage unit connected with the transducer unit and embodied to store the converted electrical energy;
      a polling unit configured to communicate with the field device and to poll diagnosis data of the field device via the communications loop; and
      a transmission unit embodied to wirelessly transmit the polled diagnosis data to a reception unit via radio waves;
   connecting the communications module to the communications loop in parallel with the field device;
   capturing with the transducer unit in the communications module the AC communication signals and pulses on the communications loop emitted by the superordinate unit or by the field device and converting the AC communication signals and pulses into electrical energy;
   storing the converted electrical energy in the energy storage unit of the communications module up to a predetermined limit value;
   polling the diagnosis data of the field device using a communication command of the polling unit of the communications module;
   receiving the diagnosis data of the field device by the communications module via a communication command sent by the field device; and
   wirelessly transmitting the polled diagnosis data from the communications module to a reception unit as soon as the electrical energy stored in the energy storage unit reaches or exceeds the predetermined limit value and/or if the communications module receives a command for polling or transmitting.

2. The method according to claim 1, further comprising:
   sending by the reception unit the polled diagnosis data to a control station of the installation.

3. The method according to claim 1, further comprising:
   the reception unit supplementing the diagnosis data with additional information including an identification of the field device and/or a time stamp.

4. The method according to claim 1, wherein the step of wirelessly transmitting the polled diagnosis data to the reception unit is performed by the communications module after each polling of the diagnosis data.

5. The method according to claim 1, further comprising:
   combining the polled diagnosis data in the communications module and transmitting the collected diagnosis data wirelessly to the reception unit at defined time intervals.

6. The method according to claim 1, further comprising:
   sending by the superordinate unit AC communication signals and pulses on the communications loop that contain invalid commands or are addressed to an invalid address to charge the energy storage unit of the communications module.

7. A system for transmitting diagnosis data from a field device in an installation for process automation, comprising:
   a superordinate unit in communication with the field device via a two-wire communications loop;
   a communications module connected to the communications loop in parallel with the field device, the communications module including:
      a transducer unit embodied to convert alternating current (AC) communication signals and pulses that are modulated onto a direct current (DC) signal on the communications loop into electrical energy;
      an energy storage unit connected with the transducer unit and embodied to store the converted electrical energy;
      a polling unit configured to communicate with the field device and to poll diagnosis data of the field device via the communications loop; and
      a transmission unit embodied to wirelessly transmit the polled diagnosis data to a reception unit via radio waves; and
   the reception unit,
   wherein the communications module is configured to poll diagnosis data from the field device and transmit the polled diagnosis data to the reception unit via a wireless radio link as soon as a predetermined limit value of stored energy is reached in the energy storage unit of the communications module or when the communications module receives a command for polling or transmitting.

8. The system according to claim 7, wherein the communications module further includes terminals or insulation displacement terminals embodied to connect the communications module to the cables of a communications loop, wherein the communications loop is not interrupted when the communications module is connected to the communications loop.

9. The system according to claim 7, wherein the energy storage unit of the communications module is formed by a capacitor, a double-layer capacitor, a super capacitor, or a battery.

10. The system according to claim 7, wherein the transducer unit of the communications module is formed by at least one rectifier circuit, including a diode-, detector-, half- or full-rectifier, which is connected to the communications loop.

11. The system according to claim 7, wherein the communications module further includes:

a module housing enclosing the transducer unit, the energy storage unit, and the polling unit, wherein the transmission unit is located in the module housing.

12. The system according to claim 7, wherein the communications module further includes:

a module housing enclosing the transducer unit, the energy storage unit, and the polling unit, wherein the transmission unit has a separate housing and is connected to the communications module Via an interface.

13. The system according to claim 7, wherein the reception unit is designed such that the reception unit has a communications link to a control station of the installation via a wireless or wired network and provides the transmitted diagnosis data to the control system via the network.

14. The system according to claim 7, wherein the superordinate unit is configured to charge the energy storage unit of the communications module by sending AC communication signals and pulses on the communications loop that contain invalid commands or are addressed to an invalid address.

* * * * *